United States Patent [19]

Le Blanc

[11] 4,118,441
[45] Oct. 3, 1978

[54] BENEFICIATING AGENT COMPOSITION

[75] Inventor: John R. Le Blanc, Wilbraham, Mass.

[73] Assignee: Monsanto Company, St. Louis, Mo.

[21] Appl. No.: 470,252

[22] Filed: May 15, 1974

Related U.S. Application Data

[62] Division of Ser. No. 250,619, May 5, 1972, Pat. No. 3,816,308.

[51] Int. Cl.$^2$ .................. C08L 33/02; C08K 7/00
[52] U.S. Cl. ..................... 260/874; 252/8.5 A; 260/45.85 R; 526/4; 526/3
[58] Field of Search .............. 260/29.6 M, 80.8, 874, 260/78.5 R, 29.6 RB, 42.46, 80 P; 252/8.5 A, 8.5 C; 526/3

[56] References Cited

U.S. PATENT DOCUMENTS

| | | | |
|---|---|---|---|
| 2,605,221 | 7/1952 | Koeppel | 252/8.5 A |
| 2,702,788 | 2/1955 | Dawson | 252/8.5 A |
| 3,421,584 | 1/1969 | Eilers et al. | 260/29.6 M |
| 3,493,500 | 2/1970 | Volk et al. | 260/29.6 M |
| 3,502,149 | 3/1970 | Pence | 260/29.6 M |
| 3,779,952 | 12/1973 | Leonard | 260/80 P |
| 3,790,610 | 2/1974 | Lum | 260/80 P |

FOREIGN PATENT DOCUMENTS

| | | | |
|---|---|---|---|
| 872,208 | 7/1961 | United Kingdom | 260/29.6 M |
| 1,326,968 | 8/1973 | United Kingdom | 260/29.6 M |

OTHER PUBLICATIONS

Journal of Petroleum Technology–Browning Chesser–Oct. 1972, pp. 1255-1263.
Chem. Abstracts–Entry 8112ov–vol. 79–1973 Pulzer.

*Primary Examiner*—Joseph L. Schofer
*Assistant Examiner*—Peter Kulkosky
*Attorney, Agent, or Firm*—Joseph S. Nelson; William J. Farrington; James C. Logomashini

[57] ABSTRACT

The present invention relates to compositions of matter which are especially useful as beneficiating agents in the production of well drilling muds. These compositions comprise mixtures of carboxylic acid polymers and metal salts which mixtures are water soluble at a pH of less than 7.0 wherein the metal is selected from Groups IB, IIB, VIB, VIIB and VIII of the Periodic Table and lead.

5 Claims, No Drawings

BENEFICIATING AGENT COMPOSITION

This is a Division of application Ser. No. 250,619, filed May 5, 1972 and now U.S. Pat. No. 3,816,308.

BACKGROUND OF THE INVENTION

1. Field of the Invention

The present invention relates to compositions of matter which are useful as beneficiating agents for clays used in the production of well drilling muds.

2. Description of the Prior Art

Clay beneficiating agents for well drilling muds are commonly used in the industry in order to improve the yield of the mud. These beneficiating agents and drilling muds are described at length in such references as U.S. Pat. Nos. 2,948,678, 3,070,543, 3,070,544, and 3,558,545, as well as in other references. In spite of the improved yields obtained with the beneficiating agents described in the above references a need exists in the art for more efficient beneficiating agents which will give increased yields.

SUMMARY OF THE INVENTION

In accordance with the present invention a composition of matter is provided which improves the yield of a clay used in drilling muds. The composition of matter is a mixture of at least one carboxylic acid polymer and at least one metal salt which mixture has a water solubility of at least 1% by weight at a pH less than 7.0 wherein the metal is selected from the group consisting of lead and a metal from Groups IB, IIB, VIB, VIIB and VIII of the Periodic Table as set forth at pages 56 and 57 of LANGE'S HANDBOOK OF CHEMISTRY, Ninth Edition, McGraw-Hill Book Company, New York (1956).

DESCRIPTION OF THE PREFERRED EMBODIMENTS

The carboxylic acid polymer component of the beneficiating agents of the present invention is characterized by being water soluble at a pH less than 7 and more preferably in the pH range of from 2.0 to 6.5. The amount of solubility should be such that the polymer will form at least a 1% solution in water at 25° C. at a pH in the above specified ranges.

The preferred polymers are further characterized by having a number average molecular weight of at least 5,000. There is no upper limit on the molecular weight except that the practical limit is determined by the water solubility of the polymer. Those skilled in the art realize that higher molecular weight polymers will provide a higher solution viscosity and more beneficiating ability at a given polymer concentration. However, there is a practical upper limit on the molecular weight in the terms of the water solubility of the polymer and eventually a point will be reached with increasing molecular weight where the polymer no longer meets the solubility requirements outlined above.

The amount of carboxylic acid groups in the polymer is in the range of from 20 mol percent to 100 mol percent and more preferably 40 mol percent to 100 mol percent based on the total polymeric composition. These polymers are the homopolymerization products of carboxylic acid monomers such as acrylic acid, methacrylic acid, etc. Alternately, the polymers are interpolymerization products of at least one carboxylic acid monomer and at least one other monomer which is copolymerizable therewith. Examples of the carboxylic acid monomer used in the interpolymers include acrylic acid, methacrylic acid, maleic anhydride, maleic acid, fumaric acid, crotonic acid and itaconic acid, mesaconic acid, citraconic acid, etc. Examples of monomers which are copolymerizable with the carboxylic acid monomer include lower alpha olefins containing from 2 to 4 carbon atoms such as ethylene, propylene, butylene, isobutylene, alkyl vinyl ethers wherein the alkyl group contains 1 to 4 carbon atoms such as vinyl methyl ether, vinyl ethyl ether, vinyl propyl ether, vinyl butyl ether, vinyl isobutyl ether; vinyl esters such as vinyl formate, vinyl acetate, vinyl propionate, vinyl butyrate and vinyl benzoate; esters of acrylic and methacrylic acid wherein the alcohol moiety of the ester contains from 1 to 8 carbon atoms such as methyl acrylate, ethyl acrylate, 2-ethylhexyl acrylate, methyl methacrylate, ethyl methacrylate, 2-ethylhexyl methacrylate; vinyl aromatic monomers such as styrene, alpha-methyl styrene, chlorostyrene, vinyl toluene, etc.; amide type monomers such as acrylamide, methacrylamide, alkylol acrylamides such as methylol acrylamide, ethylol acrylamide, methylol methacrylamide, ethylol methacrylamide, methylol ethacrylamide, ethylol ethacrylamide, etc.; N-methylolated acrylamides and the N-methylolated methacrylamides which are etherified with a lower alkanol such as methanol, ethanol, propanol and butanol, etc. Care must be taken in the choice of comonomer and the amount thereof so that the above requirement of water solubility is met.

Preferred polymers for use in the present invention are poly(vinyl acetate-maleic anhydride), poly(ethylene-maleic anhydride), poly(vinyl methyl ether-maleic anhydride) and polyacrylic acid.

The metal salt component of the beneficiating agents of the present invention is selected from water soluble organic and inorganic metal salts of lead and metals of Groups IB, IIB, VIB, VIIB and VIII of the Periodic Table. The solubility is such that the salt will form at least a 1% solution in water at 25° C. at a pH less than 7.0. These include water soluble inorganic sulfates, nitrates and chlorides as well as metal salts of aliphatic monocarboxylic acids such as formic, acetic, propionic, n-butyric, isobutyric, etc. Preferred are organic acid salts of aliphatic monocarboxylic organic acids containing from 1 to 4 carbon atoms, where the metal is selected from the group consisting of zinc, chromium, nickel, manganese, cobalt and lead. Especially preferred are the formates and acetates of zinc, chromium, nickel, manganese, cobalt and lead.

The amount of water-soluble metal salt used in the beneficiating agents of the present invention is in the range of from 5 to 80% by weight based on the total weight of polymer and metal. More preferably, the amount of salt is in the range of from 5 to 70% by weight. Conversely, the amount of polymer in the beneficiating agent is in the range of from 95 to 20% and more preferably 95 to 30% by weight.

The amount of beneficiating agents (polymer and salt) used in the present invention depends to some extent on the degree of beneficiation desired and varies with the clay. Generally, only very small quantities are required and amounts within the range from about 0.1 to about 10 lb. per ton of clay will produce satisfactory results. The preferred quantities for treatment are from about 1.5 to 3.5 lb. of beneficiating agent per ton of clay. In general, the yield obtainable at a concentration of 3 lbs. of the interpolymers per ton of clay lies in the range from 160–190 barrels. With some clays, yields as high as 270 barrels have been achieved by increasing the concentration to 3.5 lb./ton of clay. In some instances, a maximum yield of 150 barrels is obtained with 1.5 lb. of the interpolymers per ton of clay and further addition results in a decrease in yield value.

The beneficiating agents of the present invention are prepared by dry blending the polymeric and metal salt components, by mixing aqueous solutions of these components or by dissolving one component in a solution of the other component. Alternately, the polymeric and metal salt components may be dry blended with the clay or added to clay slurries which may already contain the other component. Other methods well known to those skilled in the art may also be used.

A preferred embodiment of the present invention calls for the use of a flocculating agent in combination with the clay beneficiating agents of the present invention. The flocculating agents are used in amounts of from 0 to 100% by weight based on the weight of the polymeric component of the beneficiating agent. Examples of these flocculating agents, which are well known in the art, include polyacrylamide, starch and starch derivatives, polyethylene oxide, polyacrylic acid, etc.

The clays which are used in well drilling operations are well known to those skilled in the art. Especially preferred are the montmorillonite and bentonite clays. Species of these clays include beidellite, nontronite, hectorite and saponite. Some of these clays are presently too expensive for use in drilling muds, but nevertheless are susceptible to having their yield increased by the practice of this invention. As a practical matter, the invention will find its widest application in conjunction with the beneficiation of bentonite or montmorillonite. These clays, in the raw state, usually have a rather low yield of the order of 30 to 35 barrels per ton and will desirably be beneficiated until the yield exceeds 90 barrels per ton so as to meet the minimum specifications of many purchasers.

The beneficiating agents of the present invention can be added to the clay in any desired manner. In general, a simple mechanical mixture of the clay and beneficiating agent is prepared by dry-blending the beneficiating agent in powder form directly with dry clay. This can be done conveniently at the time the clay is ground in a roller mill, for example. Alternatively, an aqueous solution of the beneficiating agent may be sprayed directly onto the clay either in stock piles, after crushing, during the grinding operation, or during a bag-packing operation. Also, if desired, the clay and beneficiating agent can be separately added in any desired order to form a slurry. This type of wet mixing could be employed, for example, at the well site.

The "yield" of a clay such as bentonite is expressed as the number of barrels of 15 centipoises mud which can be prepared from one ton of clay. The effectiveness of polymers in increasing yield is determined by adding 0.05 pound of the polymer per barrel of bentonite dispersions and then determining the yield. Solutions of one percent by weight of the polymers are used to insure adequate mixing of the polymer in the mud and to avoid the weighing of the small quantities of polymer required. The concentration of bentonite used is 2.8 and 4 percent by weight, or 10 and 14 pounds per barrel. The bentonite is added to 350 milliliters of water in a quart jar. It is then mixed on a Hamilton Beach Mixer, Model 30, at approximately 12,000 r.p.m. for a total of 20 minutes. After 10 minutes of mixing, any bentonite which is on the sides of the jar is scraped back and mixing is continued for 5 minutes. The polymer is then added, generally 5 cc. of a 1 percent solution (0.05 pound per barrel) and the mud is mixed for the remaining 5 minutes. The properties are measured immediately after mixing, a Fann viscometer being used, and the fluid loss is also determined. To calculate the yield the logarithm of the apparent viscosity ($\frac{1}{2}$ of the 600 r.p.m. Fann reading) is plotted against the clay concentration in pounds per barrel. From the plotted data, the clay concentration required to give a viscosity of 15 cps. is determined. The yield in barrels per ton is calculated by the following equation:

$$Y = 2.3 + (2000/c)$$

Where:
$Y$ = yield in barrels per ton.
$c$ = clay concentration in pounds per barrel.

The basic method used to evaluate polymers for flocculation of low-yield clay is as follows: 4.0 grams of clay are added to approximately 90 milliliters of water in a stoppered 100-milliliter graduated cylinder. The clay-water mixture is thoroughly mixed by shaking, then is made up to 99 milliliters with water. 1.0 Milliliter of the polymer solution (1 percent by weight) is added and the mixture agitated for 1 minute by inverting the cylinder. The cylinder is then placed in an upright position and the timer started. The height (in milliliters) of the interface between the clear water and the flocculated settling solids is read and recorded at the following time intervals, 10 seconds, 30 seconds, 50 seconds, 80 seconds, 100 seconds, 140 seconds, 200 seconds, and 400 seconds. The logarithm of the time is plotted against the height of the interface. From the curve drawn, the time to obtain 50 milliliters of settling is determined and reported. The height of the solids after 10 seconds, will give somewhat of a measure of the time for the flocs to form and the 400-second reading will indicate the floc size.

Several methods can be used to prepare the improved drilling muds of the present invention. The beneficiating agent or the components thereof can be sprinkled dry over the mud pit. The beneficiating agent or components thereof can also be added through a hopper to the flowing mud stream. It is very much preferred, however, to prepare an aqueous solution of the beneficiating agent in a concentration of about 1 percent by weight. This solution is then added intermittently, or preferably continuously, to the mud system. The point of addition is usually at the point where the mud enters the well or leaves the mud pit. In some cases, introduction at other points, or at multiple points is advisable.

The following examples are set forth in illustration of the present invention and should not be construed as a limitation thereof. All parts and percentages given are by weight unless otherwise indicated.

EXAMPLE 1 (CONTROL)

This example is set forth to illustrate the beneficiating agents of the prior art. The beneficiating agent used in this example is as follows:

poly(vinyl acetate-maleic anhydride) (1):55 parts
polyacrylamide (2):10 parts
soda ash (sodium carbonate):28 parts
calcium hydroxide:7 parts (1) 1:1 mol ratio having a specific viscosity of about 4.0 as measured as a 1% solution in cyclohexanone at 25° C., which is commercially available as Lytron 887 from Monsanto Company.

(2) Flocculating agent commercially available as Separan NP-10 from Dow Chemical Company.

Yield tests as described above, are carried out using the foregoing beneficiating agent in combination with five different grades of bentonite clay which are abitrarily designated A to E. The results of these tests are listed in Table 1 below along with the results of a flocculation test.

EXAMPLE 2

This example is set forth to illustrate the improved beneficiating agents of the present invention. Example 1 is repeated here using the same polymer and same flocculating agent except that zinc acetate is used in place of the soda ash and calcium hydroxide used in Example 1. The beneficiating agent used in this example is as follows:

poly(vinyl acetate-maleic anhydride):55 parts
polyacrylamide:10 parts
zinc acetate:35 parts Yield tests are carried out as above and the results are reported in Table 1 below along with the results of a flocculation test.

TABLE 1
SUMMARY OF YIELD TESTS FOR EXAMPLES 1 and 2

| Type of Bentonite Used | Yield Tests (Barrels of mud) | |
|---|---|---|
| | Example 1 | Example 2 |
| A | 150 | 232 |
| B | 114 | 176 |
| C | 130 | 184 |
| D | 126 | 177 |
| E | 136 | 189 |

FLOCCULATION TESTS

| Example | Flocculation Time (Seconds) |
|---|---|
| 1 | 14 |
| 2 | 16 |

The above results indicate that the use of a mixture of a water soluble carboxylic acid polymer and a metal salt such as zinc acetate in accordance with the teachings of the present invention provides a substantial increase in yield of 15 cps. barrels of mud with all five grades of bentonite tested. Moreover, this increase is obtained with no adverse effect on the flocculating power of the polyacrylamide used in the beneficiating agent.

EXAMPLE 3

Examples 1 and 2 are repeated here using the bentonite clay designated as A, except that the polyacrylamide flocculating agent is omitted from the formulations. The purpose of this example is to illustrate that the beneficiating agents of the present invention improve the yield of mud regardless of whether or not a flocculating agent is used. The results of these tests are set forth below:

| Beneficiating Agent | Yield |
|---|---|
| Example 1 (Control) | 147 |
| Example 2 | 210 |

As is evident from the above data the beneficiating agents of the present invention provide a significant improvement in yield independently of the use of a flocculating agent.

EXAMPLE 4

Example 2 (using the bentonite designated as A) is repeated here except that other water soluble metal salts are used in place of the zinc acetate used in Example 2. Results of the yield and flocculation tests are set forth below:

| Metal Salt | Periodic Table Group | Yield | Flocculation Time (Seconds) |
|---|---|---|---|
| Example I (Control) | 1A, IIA | 150 | 14 |
| Manganese formate | VIIB | 190 | * |
| Nickel acetate | VIII | 186 | 15 |
| Chromium acetate | VIB | 160 | 14 |
| Cupric acetate | IB | 250 | 20 |
| Cobaltous acetate | VIII | 181 | 16 |
| Lead Acetate | IVB | 181 | * |

*test not run

EXAMPLE 5

This example illustrates the use of a water-soluble ethylene-maleic anhydride copolymer as the polymeric component in the beneficiating agents of the present invention. The poly(ethylene-maleic anhydride) used is characterized as having a carboxylic acid content of about 50 mol percent and a specific viscosity of about 2.0 as measured as a 1% solution in cyclohexanone at 25° C. The bentonite designated as A in Example 1 and 2 above, is used in this example. Three tests are carried out using the polymer alone, the polymer with the metal salts of the prior art (Example 1) and the polymer with the zinc acetate of Example 2 in accordance with the practice of the present invention. The same relative amounts of polymer and metal salts used in Examples 1 and 2 are used here.

The results of the yield tests are set forth below:

| Beneficiating Agent | Yield |
|---|---|
| EMA Alone (||) | 100 |
| EMA + soda ash + calcium hydroxide | 100 |
| EMA + zinc acetate | 170 |
| (|) EMA = poly(ethylene-maleic anhydride) | |

EXAMPLE 6

Example 3 is repeated here except using a water soluble poly(vinyl methyl ether-maleic anhydride) copolymer, which has a carboxylic acid content of about 50 mol percent and zinc acetate. The yield of this system is 221.

EXAMPLE 7

Example 3 is repeated here except using a water soluble polyacrylic acid and zinc acetate. The yield value of this system is 269.

EXAMPLES 8-9

These examples are set forth to illustrate some of the variations in the amounts of polymer and metal salt which can be used in the practice of the present invention. No flocculating aid is used in these examples and the polymer and metal salt used are the same as those used in Example 2.

| Example | Amount of Polymer | Amount of Metal Salt | Yield |
|---|---|---|---|
| 8 | 35 parts | 65 parts | 217 |
| 9 | 95 parts | 5 parts | 166 |

EXAMPLE 10

This example illustrates the need for using a polymeric component in the beneficiating agent which is soluble at a pH of less than 7. A dry blend of 55 parts of the sodium salt of poly(styrene-maleic anhydride) 1:1 mol ratio and 35 parts of zinc acetate were dispersed in water at room temperature. It was not possible to test this composition (pH about 8.5) since a large amount of precipitation occurs. Lowering of the pH with hydrochloric acid results in more precipitation of the polymer which is not soluble at a pH less than about 8.0.

One advantage of the compositions of the present invention is that they can be used with poor grades of bentonite to increase the effectiveness of such material to a point comparable to that expected for good grades of bentonite. This can be particularly important in relatively inaccessible areas having readily available poor grades of bentonite, but no high-quality clays.

By use of these compositions, the viscosity of water containing a very low concentration of bentonite can be increased and the fluid loss can be decreased to increase the efficiency of the water when used as a fracturing fluid. Due to the low concentration of bentonite, there is less tendency for the fracture to become plugged by the clay when the well is put back on production. The same advantage applies to dilute clay slurries used opposite zones to be perforated with bullet or jet perforators.

In addition to being used as beneficiating agents for drilling muds, the compositions of the present invention may also be used as binders for ceramic materials, thickening agents, coagulants, textile sizes, cement additives, etc.

What is claimed is:

1. A water-soluble composition of matter to improve the yield of a clay drilling mud, consisting essentially of a mixture of (A) from 95 to 20% by weight of a polymer of at least one carboxylic acid monomer selected from the group consisting of acrylic acid, methacrylic acid, maleic anhydride, maleic acid, crotonic acid, itaconic acid, mesaconic acid, and citraconic acid, and (B) from 5 to 80% by weight of at least one water soluble sulfate, nitrate, chloride or aliphatic monocarboxylic acid salt of a metal selected from the group consisting of lead and metals from Groups IB, IIB, VIB, VIIB, and VIII of the Periodic Table; wherein the carboxylic acid polymer is characterized as having a carboxylic acid monomer content in the range of from 20 to 100 mol percent, a number average molecular weight of at least 5,000 and a solubility in water at a pH of less than 7 of at least 1% by weight at 25° C.; wherein the salt has a water solubility of at least 1% by weight at a pH less than 7; and wherein said aliphatic monocarboxylic acid contains 1 to 4 carbon atoms.

2. The composition of matter as in claim 1 wherein the soluble metal salt is selected from the group consisting of acetates and formates of manganese, nickel, chromium, copper, cobalt and lead.

3. A composition of claim 1 wherein the polymer is a maleic anhydride copolymer having a comonomer selected from the group consisting of vinyl acetate, ethylene and vinyl methyl ether.

4. A composition of matter as in claim 1 wherein the metal salt is zinc acetate.

5. A composition of claim 1 which further includes a polyacrylamide flocculating atent.